United States Patent [19]
Pataki

[11] Patent Number: 4,741,947
[45] Date of Patent: May 3, 1988

[54] WATER-BASED EPOXY PATTERNED POROUS INSULATION

[75] Inventor: William S. Pataki, Schellsburg, Pa.

[73] Assignee: Westinghouse Electric Corp., Pittsburgh, Pa.

[21] Appl. No.: 855,250

[22] Filed: Apr. 24, 1986

[51] Int. Cl.⁴ .............................................. B32B 3/00
[52] U.S. Cl. .................................... 428/211; 428/195; 428/292; 428/334; 428/335; 428/343; 428/349; 428/354; 428/413; 428/537.5; 428/906
[58] Field of Search ............... 428/195, 211, 354, 413, 428/292, 334, 335, 343, 349, 537.5, 906

[56] References Cited

U.S. PATENT DOCUMENTS

| 3,237,136 | 2/1966 | Ford | 336/205 |
| 3,246,271 | 4/1966 | Ford | 336/94 |
| 4,095,557 | 6/1978 | Croop et al. | 118/301 |

Primary Examiner—John E. Kittle
Assistant Examiner—P. R. Schwartz
Attorney, Agent, or Firm—D. P. Cillo

[57] ABSTRACT

An adhesive solid emulsion, containing both high and low epoxy equivalent weight epoxy solids, a curing agent and an optional emulsifying agent, in a carrier containing at least about 55 weight percent water is continuously coated on at least one side of a moving, porous, flexible sheet as discrete resin pattern areas, which resin coated sheet is heated to dry the adhesive emulsion to the B-stage.

5 Claims, 2 Drawing Sheets

4

WATER-BASED EPOXY PATTERNED POROUS INSULATION

BACKGROUND OF THE INVENTION

In the transformer coil art, a number of methods have been adopted for holding or anchoring the turns of an electrical coil, so that they can resist movement when the turns are subjected to the flow of current and consequent electromagnetic forces tending to move them out of position. A commonly practiced method is to bond the turns of the coil to the layer insulation by the use of resinous adhesive layers or resin solution impregnated layer insulation. This method has not been entirely satisfactory, since by filling the coil with such continuous adhesive layers or completely resin solution impregnated materials, it is rendered impervious to the penetration of oil which is essential in providing high impulse strength in transformers.

To provide improved porous solidification of transformer coils, which will withstand large surges of power with resulting high mechanical stresses, Ford, in U.S. Pat. Nos. 3,237,136 and 3,246,271 used discontinuously patterned resin solution impregnated Kraft paper as the restraint. This method averages about a 0.25 mil to 1.5 mil adhesive thickness build. Resinous solutions of shellac or epoxy resin, to cover from 25% to 75% of the Kraft paper sheet, were taught.

This coating with resin solution covers the paper fibers under the adhesive pattern. When the patterned paper is subjected to a high humidity atmosphere, the paper surrounding the adhesive pattern can swell such that, in some cases, the adhesive pattern forms a depression and is rendered ineffective to bond coils. Problems of resin solution running outside of the patterned area were also encountered. Additionally, these resinous solutions usually utilized all organic glycol ether solvent carriers, such as methyl Cellosolve or ethyl Cellosolve, or other organic solvents which could pose health problems, and which required costly incineration of the displaced solvents used to deposit resin solids.

Other methods, such as those of Croop et al., in U.S. Pat. No. 4,095,557, have provided thicker builds of adhesive patterns using resin powder particle application by electrostatic spraying through a patterned mask onto moving Kraft paper. In Croop et al., epoxy resin powder was generally preferred, allowing builds of up to 25 mils. While resin running, solution saturation and solvent problems were solved, fine epoxy dust posed a health threat, and the equipment used in the process was both complex and expensive. What is needed is a simplified, inexpensive method of making a highly porous, oil permeable insulation, having a discontinuous, clear and precise, discrete pattern about 1 mil thick, and not saturating the insulation sheet, applied in a manner to eliminate or alleviate possible resin dust or organic solvent health hazards.

SUMMARY OF THE INVENTION

The above needs have been met and the above problems solved, by providing a waterborne epoxy adhesive having an extremely high molecular weight epoxy resin component, for application as discrete resin pattern areas to various insulating sheets commonly found in transformer insulation. The epoxy adhesive of this invention is an emulsion of solids in a carrier liquid, where preferably the carrier liquid contains about 55 wt.% water. The adhesive preferably contains from about a 30 wt.% to about a 65 wt.% solids admixture of: (A) epoxy resin having an extremely high epoxy equivalent weight range of from about 5,000 to about 10,000, thus an extremely high molecular weight, (B) low molecular weight epoxy resin having a low epoxy equivalent weight range of from about 125 to about 1,500, (C) an effective amount of a curing agent for the epoxy resins, and preferably, (D) an effective amount of an emulsifying agent capable of hydrogen-bonding the epoxy and water components of the adhesive to form a stable homogeneous admixture.

This epoxy adhesive emulsion contains solids and a liquid carrier. The liquid carrier would be most preferably almost all water, but may contain up to about 45 wt.%, preferably no more than about 38 wt.% of organic solvent based on total liquid, such as methyl ethyl ketone, which strong organic solvent may be necessary for commercial emulsification of the extremely high molecular weight epoxy component in solution. Preferably, the vol.% range of organic solvent:resin solids (all water being excluded) is no more than 40 vol.% organic solvent per 60 vol.% solids.

Additionally, the solids weight ratio of extremely high molecular weight-high epoxy equivalent weight epoxy resin:low molecular weight-low epoxy equivalent weight epoxy resin is from 0.15 to 0.65:1. The preferred adhesive emulsion contains: (A) an organic solution of a bisphenol A epoxy resin having an epoxy equivalent weight of about 7500, (B) an aqueous dispersion of a bisphenol A epoxy resin having an epoxy equivalent weight of about 650, (C) solid, boron containing amine titanate complex as a latent curing agent for the epoxies, and (D) an anionic emulsifier. This provides a 42 wt.% solids emulsion, where 21 wt.% of the carrier is organic, and the solids weight ratio of extremely high molecular weight epoxy resin:low molecular weight epoxy resin is 0.32:1.

Use of a carrier that is at least about 55 wt.% water in the adhesive emulsion would help eliminate the need of costly incineration of displaced organic solvent in the manufacturing process, and partially or completely eliminate the need for use of many organic solvents suspected of having deleterious effects on humans. The emulsion formulation of this invention will remain on the surface of the insulating paper to which it is applied without saturation under the adhesive pattern, generally in a discrete diamond pattern. Since the emulsion does not saturate the paper, the adhesive pattern would not prevent subsequent bonding of wrapped paper layers or interference with oil permeation needed in transformer applications. By "not saturating" under the adhesive patterns is meant that the emulsion penetrates no more than about 0.2 mil (0.0002 inch) into the sheet material after B-stage drying.

The emulsion formulation, additionally, will not "run" outside of the pattern in which it is applied. This provides, after drying to the B-stage, a clear and precise, discrete, patterned, flexible, porous, adhesive coated substrate. This adhesive substrate is capable of being wound for storage without blocking, after which it can be wound on, or to support, electrical conductors, and heated to finally cure and bond the adhesive epoxy patterned areas to each other, while still allowing subsequent oil permeation. Usually, the epoxy patterns can cover from about 10% to 90% of the substrate surface area, and each epoxy patterned area can have a thickness of from about 0.2 mil (0.0002 inch) to about 1.25 mil (0.00125 inch) after drying to the B-stage.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
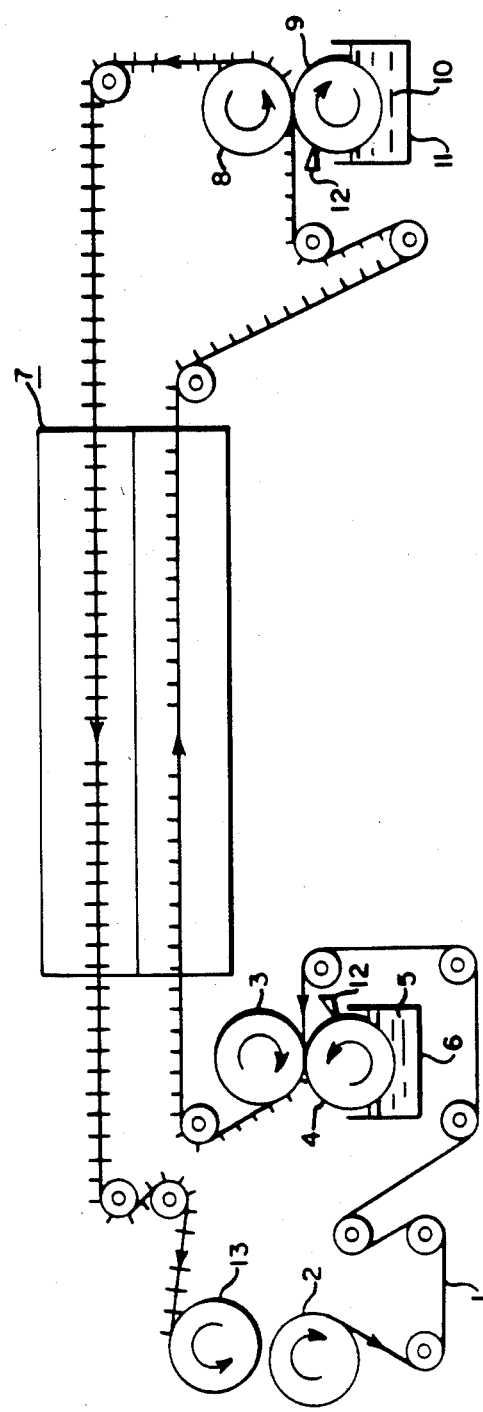
FIG. 1 shows a schematic diagram of one method of making the resin coated paper, which can be used as supports and layer insulation in the coil of this invention.

Referring now to FIG. 1, a flexible, porous sheet or web material 1 about 0.25 mil to 30 mils (0.00025 inch to 0.030 inch) thick, such as, for example, cellulosic sheet, for example cotton or paper; polyester fabric; mica paper; polyamide or polyimide or polyethylene glycol terephthalate ester sheet, is used as the substrate. Preferably 1 mil to 30 mil crepe or Kraft paper, having a moisture content of from about 2 percent to 10 percent is used. Preferably, the paper will be thermally stabilized and contain within its interstices an effective amount, generally about 0.02 weight percent to 5 weight percent of a stabilizing agent. Suitable stabilizing agents would include melamine, triethyl melamine, triphenyl melamine, dialyl melamine, tris-tertiary butyl melamine, N-tertiary butyl melamine, dicyandiaminde, polyacrylamide, succinonitrile and the like. These are usually added during paper manufacturing and greatly enhance thermal stability in liquid dielectrics.

The sheet material is continuously fed from payoff reel 2, through a series of rollers, and then between contact roller 3, and a patterned print roller 4 generally having a recessed, square, circular, diamond or other pattern. The print roller 4 rotates through a resinous solution 5 in vat 6. Excess resin on the print roller is scraped off by knife blade 12 leaving resin in the patterned recesses. The recessed pattern transfers resin from the vat and applies it as discrete resin pattern areas to one side of the sheet material. The applied resin pattern corresponds to the patterned recesses in the print roller.

The resin coated, patterned sheet then passes through a drying oven 7, exits the oven, passes through a series of rollers, and then between contact roller 8 and a patterned print roller 9 which, similarly to print roller 4, has a recessed pattern. The print roller 9 rotates through a resinous solution 10 in vat 11. Excess resin is scraped off by knife blade 12. The recessed pattern transfers resin from the vat and applies it as discrete resin pattern areas to the other, non-coated, side of the sheet material. The sheet having a resin pattern on both sides passes through drying oven 7, exits the oven and is wound on take-up reel 13 for storage.

While resin may be applied to only one side of the sheet, it is generally applied to both sides as shown in FIG. 1. The oven temperature will range from about 80° C. to 90° C. on the initial pass from the first coating, providing primarily a drying function, and range from about 100° C. to 120° C. on the second pass, when both sides of the sheet are coated, to provide a B-stage function. The coated sheet speed will be such that dwell time in the oven will be effective to B-stage the applied resin, i.e., dry to the touch, not completely cured, but capable upon further heating to cure to the C-stage. Total oven dwell time of an incremental section of the coated sheet is about 1 minute to about 10 minutes.

Figure 2:
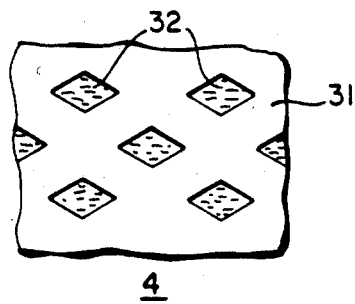
FIG. 2 is a sectional view of one pattern that can be used in the print rollers used in the method of FIG. 1.

The resin coating composition, state of cure, and resin pattern thickness must be such that the paper wound on take-up reel 13 will not block or stick. With the resin composition of this invention, patterned coating thickness can range from about 0.2 mil to about 1.25 mil on both sides. Over about 1.25 mil resin thickness, the wound coated paper will tend to block. Under 0.2 mil, little adhesive properties will be present. The area of resin pattern can range from about 10 percent to about 90 percent of the paper, but is preferably from about 45 percent to about 55 percent. When a maximum area coverage of 90 percent is used on each side of the sheet material, there will still be a sufficient area of uncoated paper for oil permeation. As shown in FIG. 2, a preferred pattern for the print roller 4 or 9 is a series of recessed diamond shapes 32 about 25 mil deep projecting into roller surface 31. Only a small portion of the resin within the recesses will be passed to the contacting sheet surface.

Useful resin solutions, 5 and 10 of FIG. 1, are waterborne epoxy adhesives having an extremely high molecular weight epoxy resin component. Useful epoxy resins include glycidyl polyethers, such as a diglycidyl ether of bisphenol A, whose principal structure may be represented by the chemical formula:

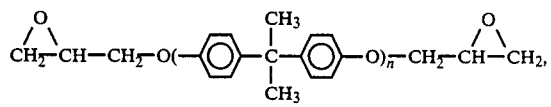

where n is an integer of the series 0, 1, 2, 3 .... These bisphenol type epoxy resins used in the invention have a 1,2 epoxy equivalency greater than one. They will generally be diepoxides. By the term "epoxy equivalent", is meant the number of 1,2 epoxy groups:

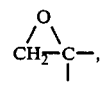

contained in the average molecule of the glycidylether. Typically, epoxy resins of bisphenol are readily available in commercial quantities and reference may be made to the *Handbook of Epoxy Resins*, McGraw-Hill Inc., 1967, by Lee and Neville, for a complete description of their synthesis.

Other resins that are useful in this invention include polyglycidylethers of a novolac. This class of epoxy resins, when in solid form, could be particularly useful as the low epoxy equivalent weight component of the epoxy mixture, provided Durran's melting points are about 75° C. or greater. The polyglycidylethers of a novolac suitable for use in accordance with this invention are prepared by reacting an epihalohydrin with phenol formaldehyde condensates. The product of the reaction is generally a massive oxidation resistant aromatic compound. Although epoxy novolac resins from formaldehyde are generally preferred for use in this invention, epoxy novolac resins from any other aldehyde such as, for example, acetaldehyde, chloraldehyde, fufuraldehyde, can also be used. An example of a suitable epoxy novolac is 2,2,bis[p-(2,3-epoxypropoxy)-phenyl]methane. These resins are also well known in the art, and reference may be made to the *Handbook of Epoxy Resins* by Lee and Neville for a complete description of their synthesis.

These epoxy resins can be characterized by reference to their epoxy equivalent weight, which is defined as the mean molecular weight of the particular resin divided by the mean number of epoxy groups per molecule. Thus, the number of epoxy equivalents = weight of the epoxy resin/epoxy equivalent weight. The term epoxy equivalent weight (EEW) is widely used and well known in the art, and is generally used, for example, by Lee and Neville, to describe epoxy resins.

Curing agents can include almost any amide, amine, solid anhydride, phenolic type, Lewis Acid complex, boron compound, titanate, or the like. The catalyst must be room temperature latent, i.e., not be active with the epoxies at ambient temperatures while in the vat awaiting coating, but must be very reactive during final C-stage curing to provide a complete cure, usually at temperatures of from 125° C. to 220° C. for ½ hour to 6 hours. During oven B-staging, the catalyst will be active, but the time period is so short that minimal reaction occurs.

Particularly useful catalysts include amides, such as dycandiamide; tertiary amines such as triethanolamine; imidazoles—a class of amine—such as 2-methylimidazole; solid anhydrides, such as hexahydrophthalic anhydride; Lewis Acids and their complexes such as BF$_3$ monoethylamine; and borate complexes, such as a complex of trihexylene glycol biborate and a titanate, such as triethanolamine titanate. All of these compounds are well known epoxy catalysts, that are exhaustively treated in the *Handbook of Epoxy Resins* by Lee and Neville, from chapters 9 through 12.

Emulsifying agents are well known in the art and are generally long aliphatic molecular chain compounds with many oxygenated substituents to promote hydrogen bonding, and possibly also promote attractive van der Walls forces between as many components in the emulsion as possible, in this invention primarily the water and the epoxies. Useful substituents on or in the aliphatic chain can include, for example, hydroxyl groups, ether groups, ester groups, ketone groups and carboxylic acid groups. Some emulsifiers are also suitable as surfactants. They can be nonionic and may include octylphenol or nonylphenol alkylaryl ether alcohols, alkylaryl polyethylene glycol ethers; ethoxylated alcohols, and the like; or anionic and may include sodium alkaryl polyether sulfonates; phosphate esters; dioctyl sodium sulfosuccinates; and the like.

Chemical structures for two types of most preferred emulsifying agents are set forth as Emulsifier Structures (I) and (II) below:

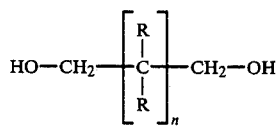

(I)

where R can be H, CH$_2$OH, C$_2$H$_4$OH, and the like, and n is an integer 1, 2, 3, 4, etc.

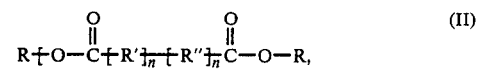

(II)

where R can be H$^+$ or Na$^+$, R' can be CH$_2$, or the like and R'' can be

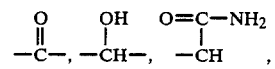

or the like, and where R' and R'' can repeat in the molecular chain in random copolymer fashion. The emulsifier must be effective, in small amounts, to form a stable suspension and provide a homogeneous admixture of organic solvent, when present, water and high and low molecular weight epoxy resin. The term "emulsifying agent" will be used herein to mean compounds that accomplish such results.

The waterborne epoxy adhesive of this invention is a stable, homogeneous, about 30 weight percent to about 65 weight percent solids emulsion admixture, having a viscosity of from about 200 cps. to about 4,000 cps. at 25° C., and containing: (A) epoxy resin having an epoxy equivalent weight range of from about 5,000 to about 10,000, generally in an organic solvent solution, (B) epoxy resin having an epoxy equivalent weight range of from about 125 to about 1,500, generally in an aqueous dispersion, (C) curing agent for the epoxy resins that is effective to cause polymerization and reaction at temperatures over about 80° C., but remains unreactive with epoxies at temperatures below about 45° C., and preferably, (D) emulsifying agent. Up to about 45 weight percent organic solvent can be used based on total organic solvent plus water carrier, but preferably only up to 35 weight percent of the carrier is organic solvent. Useful organic solvents include methyl ethyl ketone; dimethylformamide; and the like well known solvents for epoxy resins. The use of low amounts of organic solvent helps to eliminate potential health problems and helps solve solvent incineration problems.

The useful solids weight ratio of high epoxy equivalent weight epoxy resin:low epoxy equivalent weight resin is from about 0.15 to 1.65:1. An amount of extremely high epoxy equivalent weight epoxy resin greater than about 0.65 part by weight/1 part by weight of low epoxy equivalent weight epoxy resin could cause initial application problems and also hot bond problems when the adhesive patterned insulating paper is wrapped around a conductor and heated. The useful effective solids weight ratio of curing agent:emulsifying agent:total epoxy solids is from about 5 to 35:0 to 2.5 preferably 0.5 to 2.5:100 parts epoxy.

Figure 3:
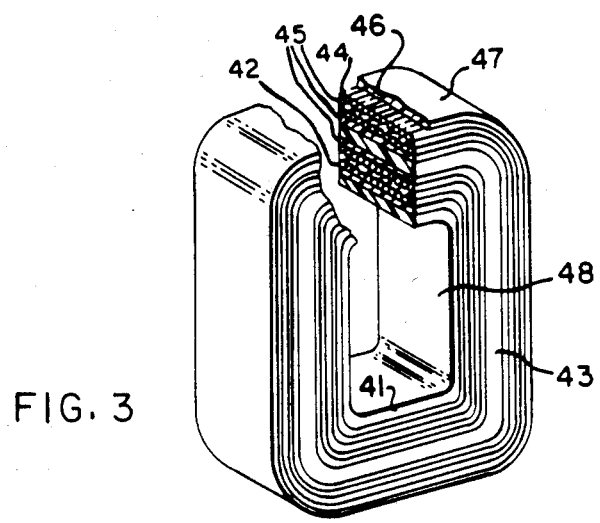
FIG. 3 is a sectional three dimensional view of the windings of a transformer made in accordance with the method of this invention.

Referring now to FIG. 3, transformer windings are shown, wound on central inner insulating tube 41, which can comprise a plurality of cured layers of the patterned porous insulation of this invention. Low voltage windings 42 are then wound on the inner tube, the winding being of a plurality of copper or aluminum flat foil layers or radially superposed layers of helically wound round or rectangular copper or aluminum wire, insulated with a resinous enamel. The size of the conductor employed will depend on the specification of the coil and the duties which it has to perform. The patterned, particle coated paper is simultaneously wound with the low voltage windings, providing layer insulation 45 between adjacent layers of the winding, layers of wire being separated from each other by patterned adhesive coated paper. Spacer 43 consisting of a plurality of layers of patterned adhesive coated paper may be wound between the low voltage windings 42 and the high voltage windings 44.

In FIG. 3, one of the high voltage windings is shown as 44 and the layers of interdisposed layer insulation of resin particle coated paper are shown at 45. The plurality of radially superposed layers of helically wound wire comprising one of the windings is shown as 46 with outer layer of resin coated paper as 47. A core formed of any suitable magnetic material is placed in space 48, in the center of the electrical coil.

The wound coil assembly can then be placed in an oven or other suitable heating means at a temperature and for a time effective to securely bond and cure the whole assembly. The transformer coil is then cooled and the adhesive hardens and bonds the various layers of the transformer coil together to form a solid, uniformly bonded, oil permeable coherent unit. The curing or thermoset temperature can vary from about 125° C. to about 220° C. for about ½ hour to 6 hours.

EXAMPLE

Three water-based epoxy resin adhesive emulsions were prepared having the compositions set forth in TABLE 1 through TABLE 3:

TABLE 1

| Resin Composition | Epoxy Equivalent Wt | Percent by Weight | Solids Weight | Percent Solids by Weight | Carrier Weight | Carrier |
|---|---|---|---|---|---|---|
| Epoxy 1 | 650 | 42.13% | 25.28 | 60.6% | 16.85 | water |
| Epoxy 2 | 7500 | 20.39% | 8.16 | 19.6% | 12.23 | organic* |
| Water | | 28.99% | — | — | 28.99 | water |
| Curing Agent | | 8.12% | 8.12 | 19.5% | — | |
| Emulsifier | | 0.38% | 0.12 | 0.3% | 0.26 | water |
| | | 100.00% | 41.68 | 100.0% | 58.33 | |

Weight percent solids = 41.7%
Weight ratio solids Epoxy 2:Epoxy 1 = 0.32:1
Weight percent organic based on total carrier = 20.9%
Weight ratio curing agent:emulsifying agent:total epoxy solids = 24.3:0.36:100
*Organic = methyl ethyl ketone
Curing agent = a complex of trihexylene glycol biborate and triethanolamine titanate
The emulsifier has a chemical structure similar to that set forth before as Emulsifier Structure (II).

TABLE 2

| Resin Composition | Epoxy Equivalent Wt. | Percent by Weight | Solids Weight | Percent Solids by Weight | Carrier Weight | Carrier |
|---|---|---|---|---|---|---|
| Epoxy 1 | 650 | 62.05% | 37.23 | 61.87% | 22.82 | water |
| Epoxy 2 | 7500 | 24.29% | 9.72 | 16.15% | 14.57 | organic* |
| Water | | — | — | — | — | |
| Curing Agent | | 12.39% | 12.39 | 20.59% | — | |
| Emulsifier | | 1.27% | 0.83 | 1.39% | 0.44 | water |
| | | 100.00% | 60.17 | 100.00% | 37.83 | |

Weight percent solids = 60.2%
Weight ratio solids Epoxy 2:Epoxy 1 = 0.26:1
Weight percent organic based on total carrier = 38.5%
Weight ratio curing agent:emulsifying agent:total epoxy solids = 26.4:1.8:100
*Organic is methyl ethyl ketone
Curing agent = a complex of trihexylene glycol biborate and triethanolamine titanate
The emulsifier has a chemical structure similar to that set forth before as Emulsifier Structure (I).

TABLE 3

| Resin Composition | Epoxy Equivalent Wt. | Percent by Weight | Solids Weight | Percent Solids by Weight | Carrier Weight | Carrier |
|---|---|---|---|---|---|---|
| Epoxy 1 | 650 | 55.96% | 33.58 | 70.68% | 22.38 | water |
| Epoxy 2 | 7500 | 10.70% | 4.28 | 9.01% | 6.42 | organic* |
| Epoxy 2' | 7500 | 14.00% | 4.48 | 9.43% | 9.52 | organic* |
| Water | | 7.08% | — | — | 7.08 | water |
| Curing Agent | | 5.18% | 5.18 | 10.88% | — | |
| Emulsifier | | — | — | — | — | |
| Organic** | | 7.08% | — | — | 7.08 | Organic** |
| | | 100.00% | 60.17 | 100.0% | 52.48 | |

Weight percent solids = 47.5%
Weight ratio solids Epoxy 2:Epoxy 1 = 0.26:1
Weight percent organic based on total carrier = 43.8%
Weight ratio curing agent:emulsifying agent:total epoxy solids = 12.2:0:100
*Organic is methyl ethyl ketone for Epoxy 2 and Cellosolve acetate for Epoxy 2'
**Organic is methyl Cellosolve, i.e., ethylene glycol monomethyl ether
Curing agent = dicyandiamide In all the Samples, Epoxy 1 was a 60% solids nonionic aqueous dispersion of a solid bisphenol A epoxy resin. The epoxy resin had an epoxide equivalent weight of about 650, a molecular weight of about 1300, and a Durran's melting point of from 75° C. to 85° C. The viscosity of the dispersion was 12,000 cps. at 25° C. (Brookfield). The dispersion is sold commercially by Celanese Plastics Co. under the trade name CDM 35201 Epoxy Dispersion. In all of the Samples, Epoxy 2 was a 40% solids solution of a bisphenol A epoxy resin in methyl ethyl ketone. The epoxy resin had an epoxy equivalent weight of about 7,500, and a molecular weight of about 15,000. The Gardner-Holdt viscosity of the solution at 25° C. was 6-2 poises to 17.6 poises at 25° C. The solution is sold commercially by Ciba-Geigy Co. under the trade name Araldite GZ488 N-40 High Molecular Weight Epoxy Polymer Solution. In Sample C, Epoxy 2' was a 32% solids solution of a bisphenol A epoxy resin in Cellosolve acetate. The epoxy resin had an epoxy equivalent weight of about 7,500, and a molecular weight of about 15,000. The Gardner-Holdt viscosity of the solution at 25° C. was 12.9 poises to 22.7 poises at 25° C. The solution is sold commercially by Ciba-Geigy Co. under the trade name Araldite G2488 E-32 High Molecular Weight Epoxy Polymer solution.

The emulsifier used in Sample A was a pseudoplastic, water soluble, anionic emulsifier in aqueous solution, having a specific gravity at 25° C. of 1.05 and sold commercially by Scott Bader, Inc. under the trade name Texipol 63-002. The emulsifier used in Sample B was a highly ethoxylated aliphatic chain emulsifier in aqueous solution, sold commercially by Diamond Shamrock Corp. as Capcure Emulsifier 65.

In Samples A, B and C the high epoxy equivalent weight epoxy was placed in a reaction vessel with a stirrer. In Samples A and B, emulsifying agent was added at this time, where, in Sample A, the emulsifier was first mixed with the separate 28.99 wt.% addition of water. Agitation was then started. Low epoxy equivalent weight epoxy was then added very slowly, maintaining a high shearing action to provide a homogeneous emulsion. In Samples A and B, the boron-titanate curing agent was then added to the batch under agitation, while in Sample C, the dicyandiamide was first mixed with the separate additions of 7.08 wt.% water and 7.08 wt.% methyl Cellosolve organic and agitated under heat before addition. With high shear agitation, a homogeneous, stable, emulsive suspension was obtained, having a viscosity range of from about 350 cps. to 2,500 cps. at 25° C.

All three Samples were used in a pilot coating process similar to that shown in FIG. 1 of the drwwings, coating on Kraft paper sheet. With the Sample A composition, excellent pattern definition was achieved with no resin running at all. After B-stage drying, the sheet was coated on 50% of each side with diamond patterned areas about 0.5 mil thick. Final cure could be achieved at from about 125° C. to 130° C. With the Sample B composition, excellent pattern definition was achieved with no resin running at al. After B-stage drying, the sheet was coated on 50% of each side with diamond patterned areas about 0.5 mil thick. Final cure could be achieved at about 125° C. With the Sample C composition, very good pattern definition was achieved with very minimal running. A very minor amount of dicyandiamide separation was observed in the coating vat. After B-stage drying, the sheet was coated on 50% of each side with diamond patterned areas about 0.5 mil thick. Final cure with the dicyandiamide curing agent required the somewhat higher temperature of about 140° C. to get good bonding. For all three samples, there was no saturation under the adhesive patterns. In all instances, a plurality of layers of coated paper were wound on a mandrel and C-stage cured to form oil permeable insulating tubes and also wound on conductors to provide oil permeable insulation layers.

I claim:

1. A flexible, B-staged, porous insulation comprising a porous sheet material, having coated thereon discrete pattern areas of adhesive resin, covering from about 10 percent to about 90 percent of the area of at least one side of the sheet, said adhesive resin comprising a first epoxy resin, having an epoxy equivalent weight range of from about 5,000 to about 10,000; and a second epoxy resin, having an epoxy equivalent weight range of from about 125 to about 1,500, where the weight ratio of first epoxy resin: second epoxy resin is from about 0.15 to 0.65:1, the thickness of the resin pattern is from about 0.0002 inch to about 0.00125 inch, and the resin does not saturate under the adhesive pattern areas any more than about 0.0002 inch.

2. The flexible insulation of claim 1, where the sheet material is a cellulosic sheet material from about 0.00025 inch to about 0.030 inch thick, and is capable of being wound around an article and heated to cure the adhesive resin.

3. The flexible insulation of claim 1, where the sheet material is Kraft paper, and the insulation is capable of being wound for storage without blocking.

4. The flexible insulation of claim 1, where both epoxy resins are diglycidyl ethers of bisphenol A, and the first epoxy resin has an extremely high molecular weight.

5. The flexible insulation of claim 1, where the adhesive resin also contains curing agent and the pattern areas contain the dried solids of a resinous water-organic emulsion.

* * * * *